United States Patent [19]
Brackus

[11] Patent Number: 5,230,495
[45] Date of Patent: Jul. 27, 1993

[54] VEHICULAR DASHBOARD BRACKET

[76] Inventor: Nick Brackus, 611 E. 44th St., Boise, Id. 83714

[21] Appl. No.: 952,479

[22] Filed: Sep. 25, 1992

Related U.S. Application Data

[63] Continuation of Ser. No. 696,043, May 6, 1991, abandoned.

[51] Int. Cl.⁵ .............................................. F16M 11/00
[52] U.S. Cl. .................................... 248/300; 248/176
[58] Field of Search ............... 248/300, 176; 403/403, 403/382, 205, 405.1, 400; 52/714, 712, 92, 93

[56] References Cited

U.S. PATENT DOCUMENTS 3,088,620  5/1963  Crawford ........................... 248/300
4,342,177  8/1982  Smith ............................ 403/400 X

*Primary Examiner*—Alvin C. Chin-Shue
*Attorney, Agent, or Firm*—Frank J. Dykas; Craig M. Korfanta; Ken J. Pedersen

[57]  ABSTRACT

A mounting bracket (10) for attachment to a top or side trim piece of a vehicular dashboard center console (28). Said bracket (10) is formed of elongated attachment plate (12) to which is attached mounting plate extension (18) which positions mounting plate (20) alongside the center console so that attached equipment such as a cellular phone does not obscure or impede access to audio equipment and climate controls held in the center console.

4 Claims, 7 Drawing Sheets

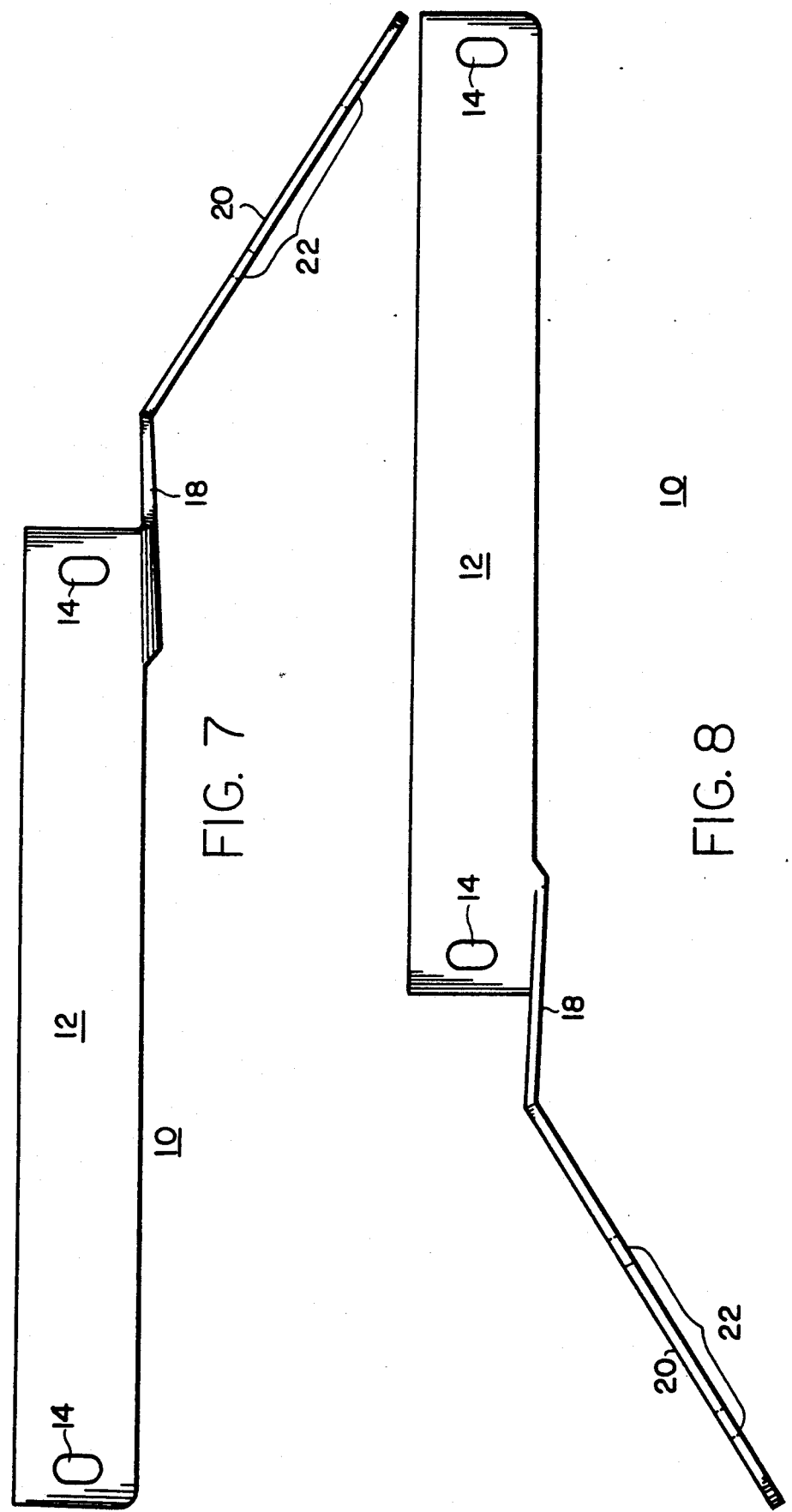

VEHICULAR DASHBOARD BRACKET

This application is a continuation of application Ser. No. 07/696,043, filed May 6, 1991 now abandoned.

BACKGROUND OF THE INVENTION

Technical Field

This invention generally relates to vehicular dashboard brackets and more particularly to a bracket which can be installed or fixed to a deshboard without modification of the dashboard or the drilling of additional screw holes.

Background Art

The use of add-on brackets to dashboards has been well known for a number of years. However, with the development of cellular phone technology, its use has dramatically increased.

Contemporaneously with this increased use of cellular phones and other types of after market installed communications gear, there has been an increase in the use of leased vehicles for commercial purposes. Oftentimes, it is a condition of the lease that no holes be drilled in the dashboards of the leased vehicles. Accordingly, there is an immediate and pressing need for the development of some sort of cellular phone bracket which can be used to conveniently position and hold a cellular phone and yet at the same time be adaptable for installation without necesitating the drilling of additional holes in the dashboard of a vehicle.

There appears to be one common design theme in the dashboards of vehicles being manufactured today and that is the development of a center console for the installation of audio and climate control displays. These consoles are typically recessed and held in position with regard to the molded side and front panels of the vehicle dashboard by means of simple screws. An examination of the typical dashboard in production today would reveal that these are perhaps the only screws which are accessible from the front dashboard. All other access, in the typical dashboard, has to be accomplished from underneath or behind the molded panel.

Accordingly, what is needed is a bracket which is adaptable to be attached to the holding screws of the center console of the vehicular dashboard.

DISCLOSURE OF INVENTION

These objects are achieved by use of a mounting bracket having an elongated attachment plate adapted to fit alongside either the upper, side, or lower trim plates of a vehicular dashboard center column console, with at least one portion of an edge of said plate extending outwardly from alongside the console trim piece. Attached to this extended edge of the elongated attachment plate is a mounting plate extension which is used to position a mounting plate alongside of the center console, so as not to obscure or impede access to the audio equipment and climate control panels.

BRIEF DESCRIPTION OF THE DRAWINGS

FIG. 7 is a top view of the mounting bracket.

FIG. 8 is a bottom view of the mounting bracket.

BEST MODE FOR CARRYING OUT INVENTION

Figure 1:
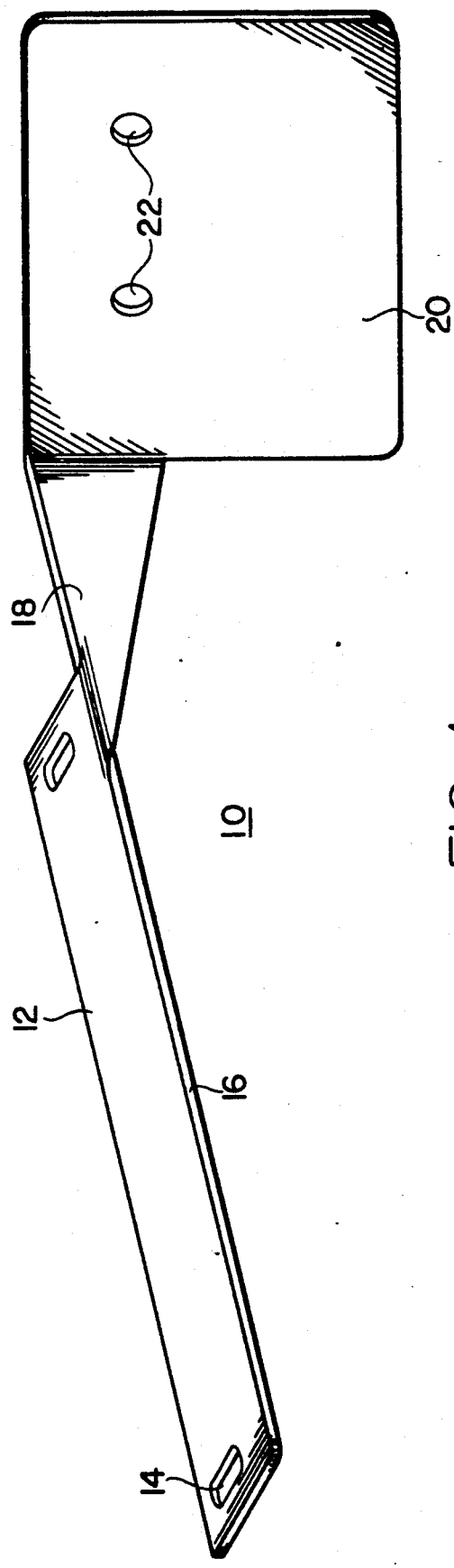
FIG. 1 is a perspective representational view of the mounting bracket configured for attachment underneath the upper trim plate of a center console.
Figure 2:
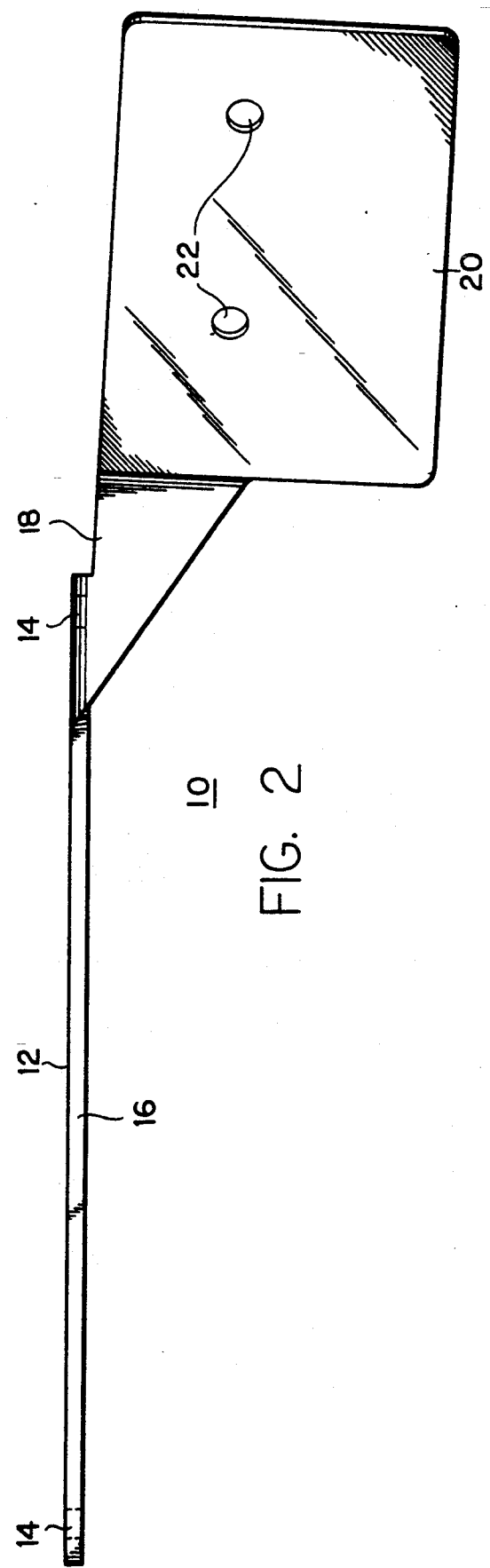
FIG. 2 is a front view of the top-mounted bracket.
Figure 3:
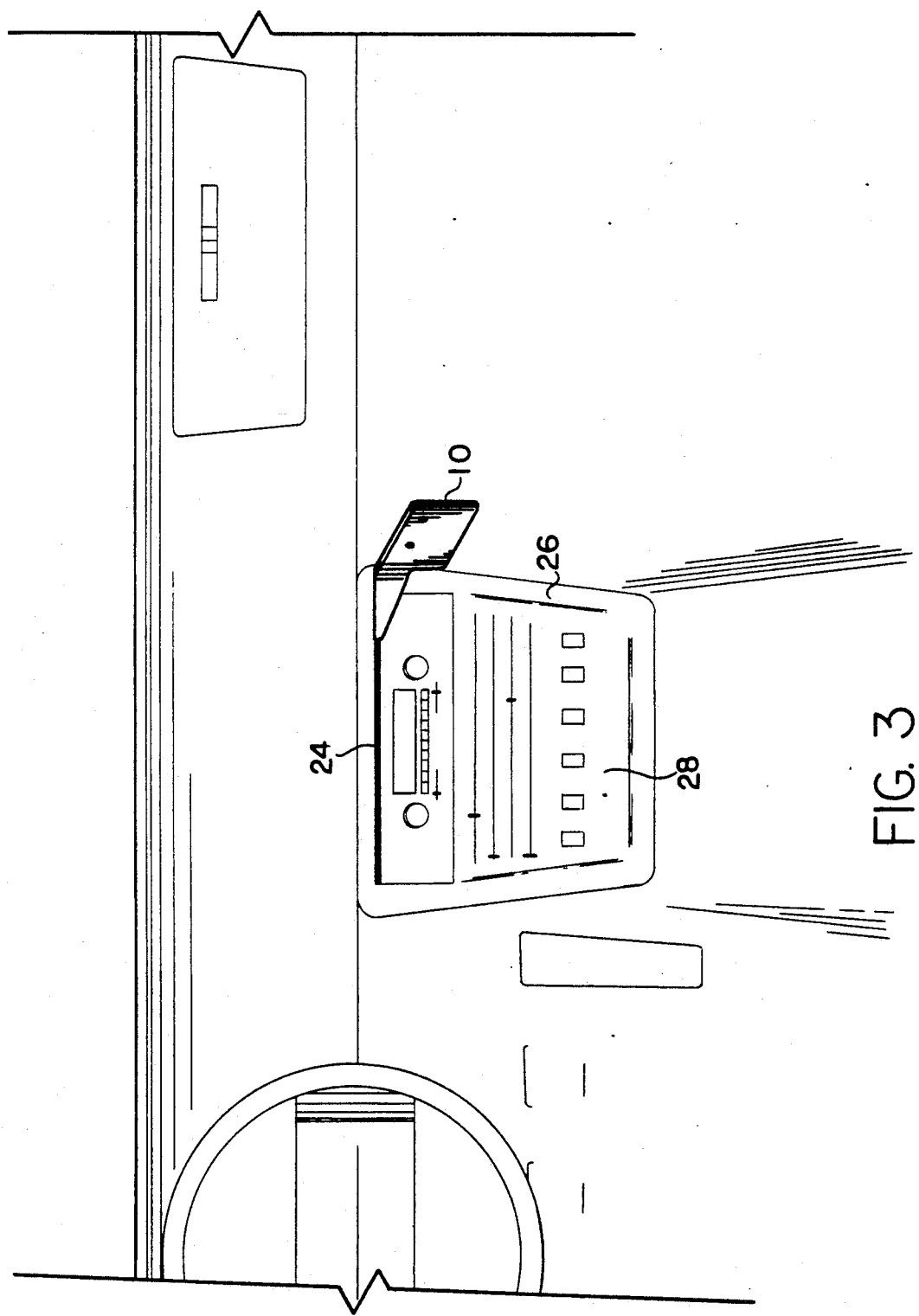
FIG. 3 is a perspective representational view of the bracket mounted to the upper trim piece of a vehicular dashboard center console.
Figure 4:
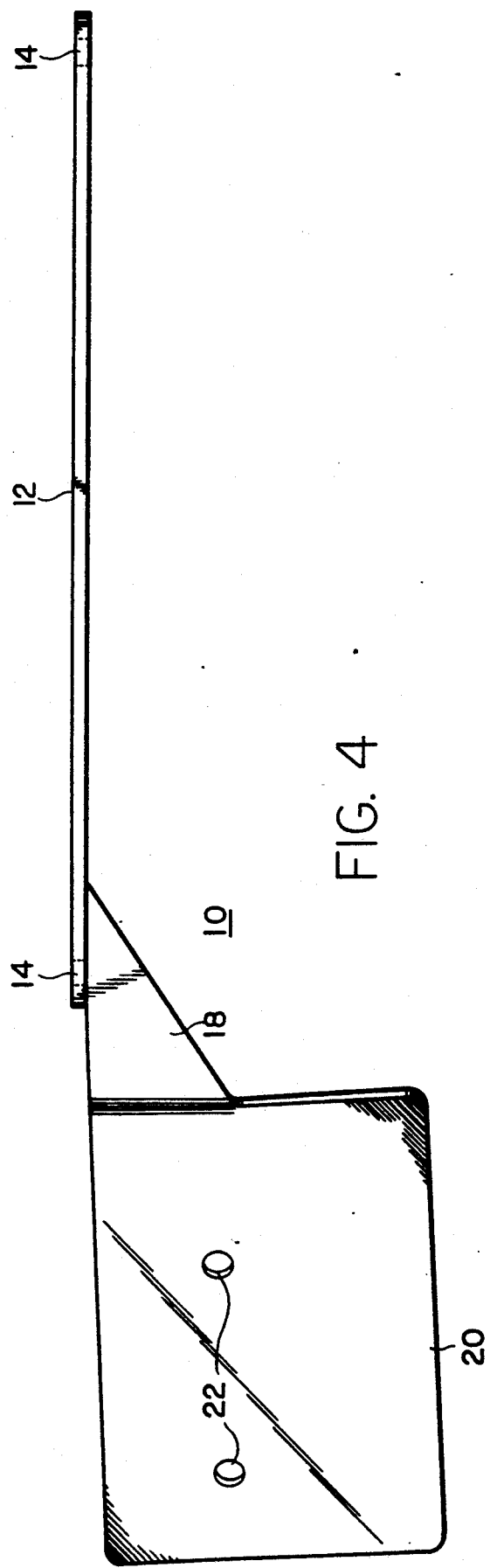
FIG. 4 is a back view of the mounting bracket.
Figure 5:
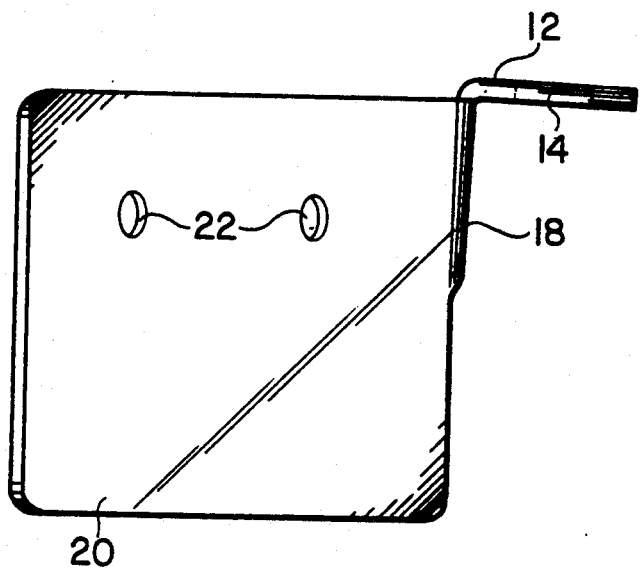
FIG. 5 is an end view of the mounting bracket viewed from the right-hand side of the dashboard as shown in FIG. 3.
Figure 6:
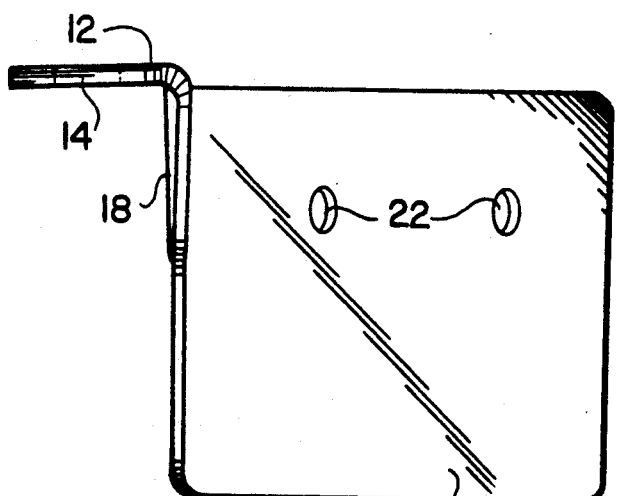
FIG. 6 is an end view of the mounting bracket viewed from the left-hand side of the dashboard as shown in FIG. 3.

First referring to FIGS. 1-8 there is shown the attachment bracket 10 in a configuration adapted for attaching the bracket to the underside of the upper trim portion of a center console of a vehicular dashboard. Most vehicles being manufactured today have as a feature of their dashboards a center console which is used to mount audio equipment and the control panel for the climate control systems of the vehicle. The purpose of the use of the center console is that it is easily adaptable to use with a variety of different pieces of equipment in a number of different configurations. Also, it is accessible in that the center console can be pulled out from the dashboard, away from the exposed face of the dashboard thus eliminating the need to disassemble the dashboard or to gain access to the equipment from underneath and behind the dashboard. Typically the center consoles are attached to the body of the dashboard by means of top, bottom, and occasionally, side trim pieces which screw into attachment points formed integral with the body of the dashboard. A typical configuration is shown in FIG. 3 wherein console 28 is held in position by upper trim piece 24 and side perimeter trim piece 26.

Bracket 10 is adapted for attachment to the underside of upper trim piece 24. Bracket 10 is formed of elongated attachment plate 12 having a forward or exposed edge 16, and bolt holes 14 which are used as attachment points for use with the screws or bolts which attach upper trim piece 24 to the body of the dashboard.

Extending out from edge 16 is mounting plate extension 18 which is used to position mounting plate 20 at an obtuse planar angle from plate extension 18 out from and alongside center console 28. The purpose of mounting plate extension 18 is that if mounting plate 20 were to be directly attached to extended edge 16, then it is likely that mounting plate 20 and the attached cellular phone or other communication equipment would cover or render inaccessible audio and climate controls. Bolt holes 22 are used as mounting points for holding a cellular phone.

Figure 9:
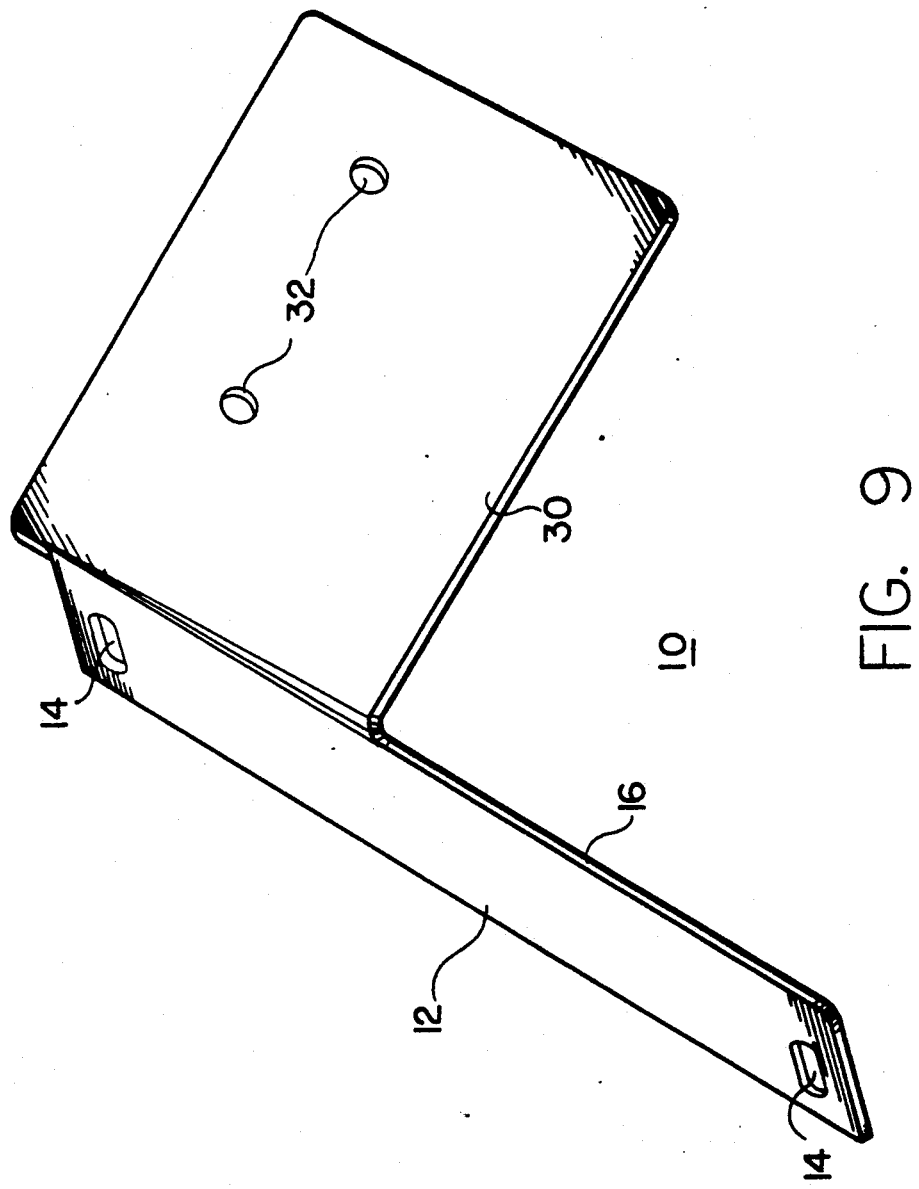
FIG. 9 is a perspective view of a second embodiment of the bracket adapted for attachment to the side trim of a vehicular dashboard center console.

Shown in FIG. 9 is a second embodiment of the bracket which is adapted for attachment to a side piece 26. This bracket is useful where the side trim piece mounting or attachment screws are accessible. In a like manner, bracket 10 is easily adapted for use with a bottom trim piece of console panel 28 with it being attached either atop the trim piece or below it.

While there is shown and described the present preferred embodiment of the invention, it is to be distinctly understood that this invention is not limited thereto but may be variously embodied to practice within the scope of the following claims.

I claim:

1. A bracket for attachment to the upper trim plate of a center console of a vehicular dashboard which consists of:
   a horizontally oriented elongated attachment plate configured to fit underneath and attach to the upper trim plate of said center console with at least a portion of one elongated edge of said elongated attachment plate extending out from underneath said upper trim plate, said attachment plate having attachment means for attaching to the console;
   a mounting extension attached to said extended edge of the elongated attachment plate and extending outwardly therefrom; and,
   a single mounting plate attached at an obtuse planar angle to the outwardly extending end of the mounting plate extension, said mounting plate having mounting means for holding a cellular phone.

2. The bracket of claim No. 1 wherein the mounting plate extension is further configured to position and hold the mounting plate alongside the console.

3. A bracket for attachment to the bottom trim plate of a center console of a vehicular dashboard which consists of:
   a horizontally oriented elongated attachment plate configured to fit alongside and attach to the bottom trim plate of said center console with at least a portion of one elongated edge of said elongated attachment plate extending out from alongside said bottom trim plate, said attachment plate having attachment means for attaching to the console.;
   a single mounting plate extension attached to said extended edge of the elongated attachment plate and extending outwardly therefrom; and,
   a mounting plate attached at an obtuse planar angle to the outwardly extending end of the mounting plate extension, said mounting plate having mounting means for holding a cellular phone.

4. The bracket of claim No. 3 wherein the mounting plate extension is further configured to position and hold the mounting plate alongside the console.

* * * * *